Figure 1:
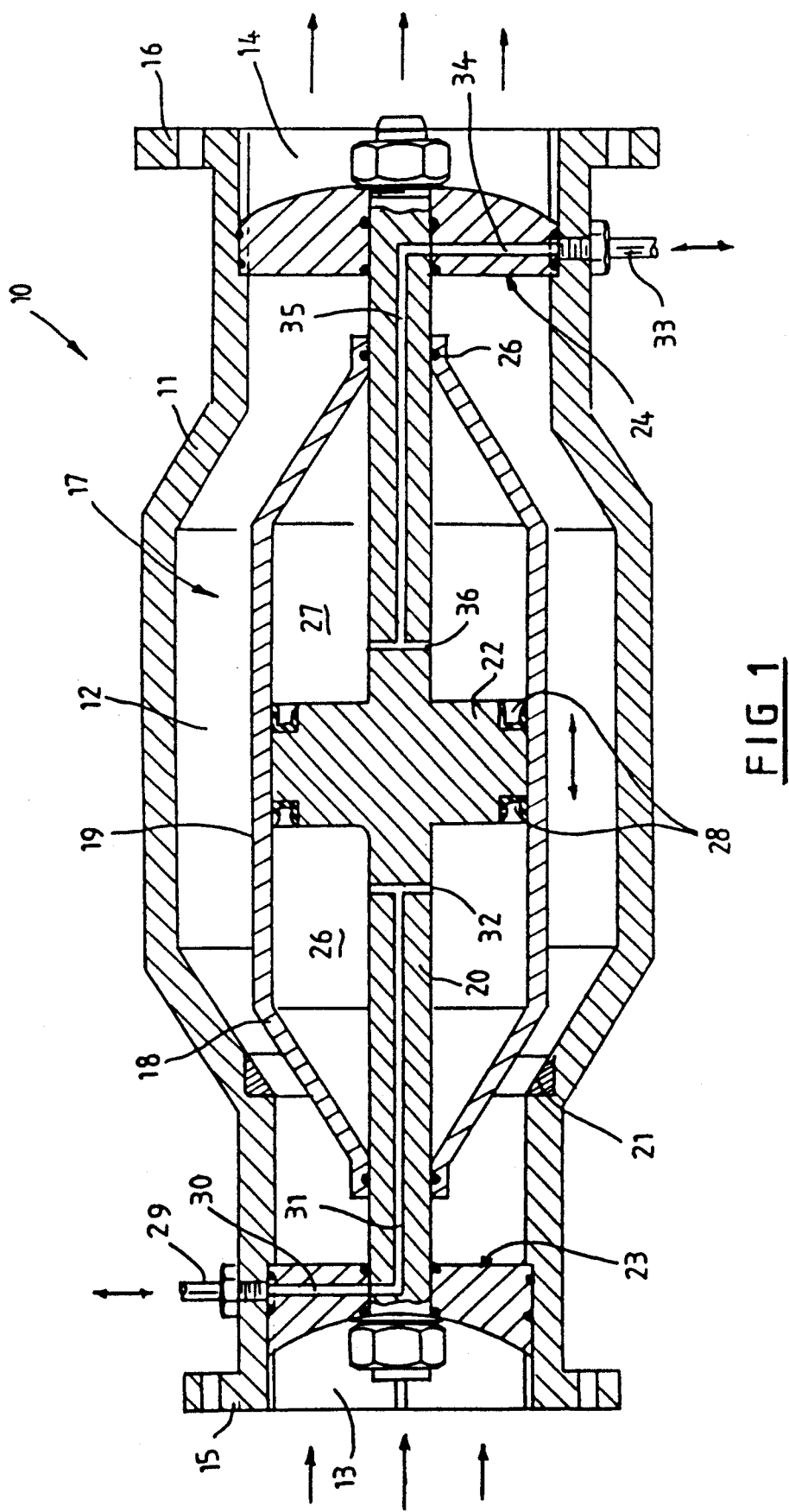

United States Patent [19]
Booyens

[11] Patent Number: 5,069,246
[45] Date of Patent: Dec. 3, 1991

[54] FLUID CONTROL VALVE AND ACTUATOR THEREFOR

[76] Inventor: Andries M. Booyens, 75 Tarentaal Avenue, Ninapark Extension 3, Akasia, Transvaal Province, South Africa

[21] Appl. No.: 402,699

[22] Filed: Sep. 1, 1989

[30] Foreign Application Priority Data

Sep. 2, 1988 [ZA] South Africa .................. 88/6534
Nov. 22, 1988 [ZA] South Africa .................. 88/8731

[51] Int. Cl.⁵ .................................................. F16K 31/12
[52] U.S. Cl. .................................... 137/219; 251/31
[58] Field of Search ........................... 137/219; 251/31

[56] References Cited

U.S. PATENT DOCUMENTS 1,824,916  9/1931  Moody ............................ 251/31 X
3,617,151 11/1971  Scroggins ...................... 137/219 X

FOREIGN PATENT DOCUMENTS 448328  5/1975  U.S.S.R. .......................... 137/219

*Primary Examiner*—Gerald A. Michalsky
*Attorney, Agent, or Firm*—Browdy and Neimark

[57] ABSTRACT

A fluid control valve 10 and an actuator 17 for a closure member 18 therefor are disclosed and claimed. The actuator 17 comprises a shaft 20 mounted to be stationary in valve body 11. A hollow member 19 is mounted on shaft 20 to reciprocate relative to the longitudinal axis of the shaft. A stationary partition mounted on shaft 20 divides member 19 into first and second fluid tight, variable volume chambers 26 and 27. By varying the pressures of fluids in chambers 26 and 27 the member 19 is caused to move between first and second positions on the shaft thereby to move the closure member 19 between open and closed positions.

9 Claims, 6 Drawing Sheets

FLUID CONTROL VALVE AND ACTUATOR THEREFOR

This invention relates to fluid control valves.

Applicant is aware of various forms of fluid control valves comprising actuators including a reciprocating piston-like member moveable in and guided by a stationary control chamber. The actuator, in use, causes a valve closure member to open and close a port defined in the valve, thereby to open and close the valve. The piston-like members are normally equipped with peripheral metal to metal sealing surfaces or resilient sliding seals or rolling diaphragms. These seals are utilised to create a seal between the stationary control chamber and moving piston-like member.

A major disadvantage of the above referred to valves, is the bulkiness of the complete valve and associated actuator assembly. In addition, the relatively large exposed peripheral seals on the external circumference of the moving piston and/or the inside walls of the stationary chamber are particularly vulnerable to damage caused by debris or other foreign matter which enters these sealing areas and which is then deposited on the walls of the chamber and/or the moving piston.

It is an object of the present invention to provide an alternative fluid control valve and an actuator therefore with which the applicant believes the aforementioned disadvantages will at least be alleviated.

According to the invention there is provided an actuator for a closure member for a fluid control valve, which valve comprises a valve body defining an inlet to the valve and an outlet from the valve, the actuator comprising:

a shaft mountable in the valve body;

a hollow member mounted on the shaft to reciprocate relative to the longitudinal axis of the shaft;

at least one stationary partition mounted on the shaft to define with the hollow member at least one fluid tight, variable volume chamber; and the or each chamber communicating with a control port so that the pressure of a fluid in the chamber may be varied to cause the hollow member to move between first and second positions on the shaft, thereby, in use, to move the closure member between open and closed positions.

Only one partition may be provided to extend transversely the longitudinal axis of the shaft to divide the hollow member into first and second fluid tight, variable volume chambers, one on either side thereof.

In another embodiment the hollow member may define first and second fluid tight cavities; the transverse cross sectional area of the first cavity being smaller than that of the second cavity; and two transversely extending partitions mounted on the shaft divide each cavity into first and second fluid tight, variable volume chambers, one on either side of each partition.

The first and second cavities are preferably spaced axially on the shaft; the cross sectional area of the first cavity preferably being smaller than that of a region of the outside wall of the hollow member constituting the valve closure member; and the cross sectional area of the second cavity preferably being substantially equal to that of the said region of the outside wall of the hollow member.

In the most preferred form of this embodiment, the first cavity, in use, faces the valve inlet; an inlet facing chamber in the first cavity, in use, communicates with the valve inlet; an outlet facing chamber in the first cavity communicates with a pressure lower than that at the valve inlet; an inlet facing chamber in the second cavity is connectable to the lower pressure to open the valve or to the pressure at the inlet to close the valve; and an outlet facing chamber in the second cavity also communicates with the lower pressure.

The valve closure member may be provided on an outside wall of the hollow member.

In the most preferred embodiment at least part of the outside wall of the hollow member constitutes the closure member.

The or each partition may be circular and mounted concentrically on the shaft; the hollow member may define a circular bore in at least a region thereof wherein the or each partition is located; and a seal may be provided between the or each partition and the hollow member.

At least one of the chambers may communicate with its associated control port via a bore defined in the shaft and extending between an opening into the chamber and the port, both the opening and the port being defined in the shaft.

Alternatively or in addition, at least one of the chambers may communicate with its associated control port via an annular passage defined between the shaft and a tube mounted concentric to and spaced from the shaft, the passage extending between an opening into the chamber and the port, both the opening and the port being defined in the tube.

The shaft may be mounted on two axially spaced spiders which are mountable in the valve body.

The aforementioned bore in the shaft may communicate with a bore defined in a radially outwardly extending spoke of the spider and the bore in the spoke may communicate with the control port.

Also included within the scope of the present invention is a fluid control valve comprising:

a valve body defining a flow passage extending between an inlet to the valve and an outlet therefrom;

an actuator for a valve closure member, the actuator being mounted in the valve body;

the actuator comprising a shaft and a hollow member mounted on the shaft to reciprocate relative to the longitudinal axis of the shaft;

the actuator further comprising at least one a stationary partition mounted on the shaft to define with the hollow member at least one fluid tight, variable volume chamber; and the or each chamber communicating with a control port in the valve body so that the pressure of a fluid in the chamber may be varied to cause the hollow member to move between first and second positions on the shaft, thereby, in use, to move the closure member between open and closed positions.

Only one partition may be provided to extend transversely the longitudinal axis of the shaft to divide the hollow member into first and second fluid tight variable volume chambers, one on either side of the partition.

An outside wall of the hollow member may constitute the valve closure member which, in use, co-operates with a valve seat in the valve body.

Figure 2:
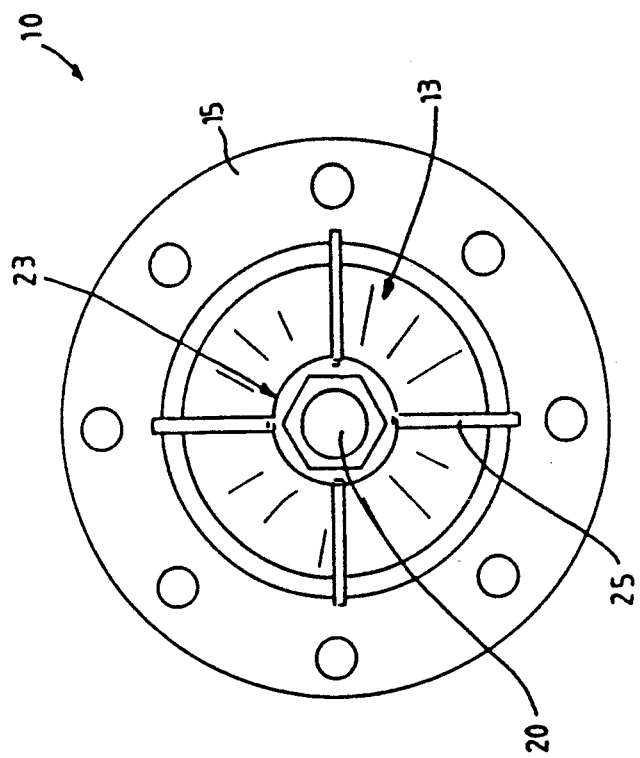
Figure 3:
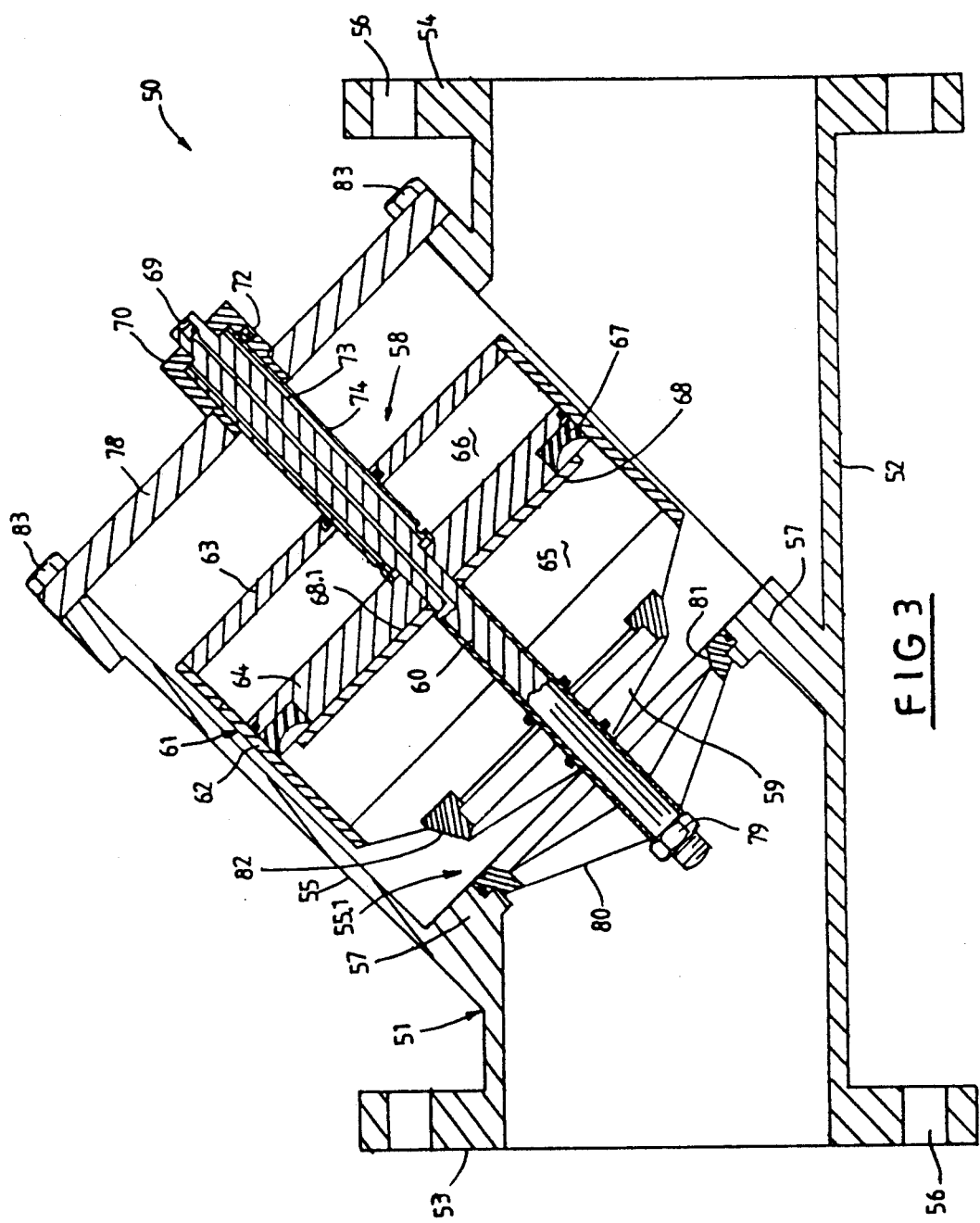
Figure 4:
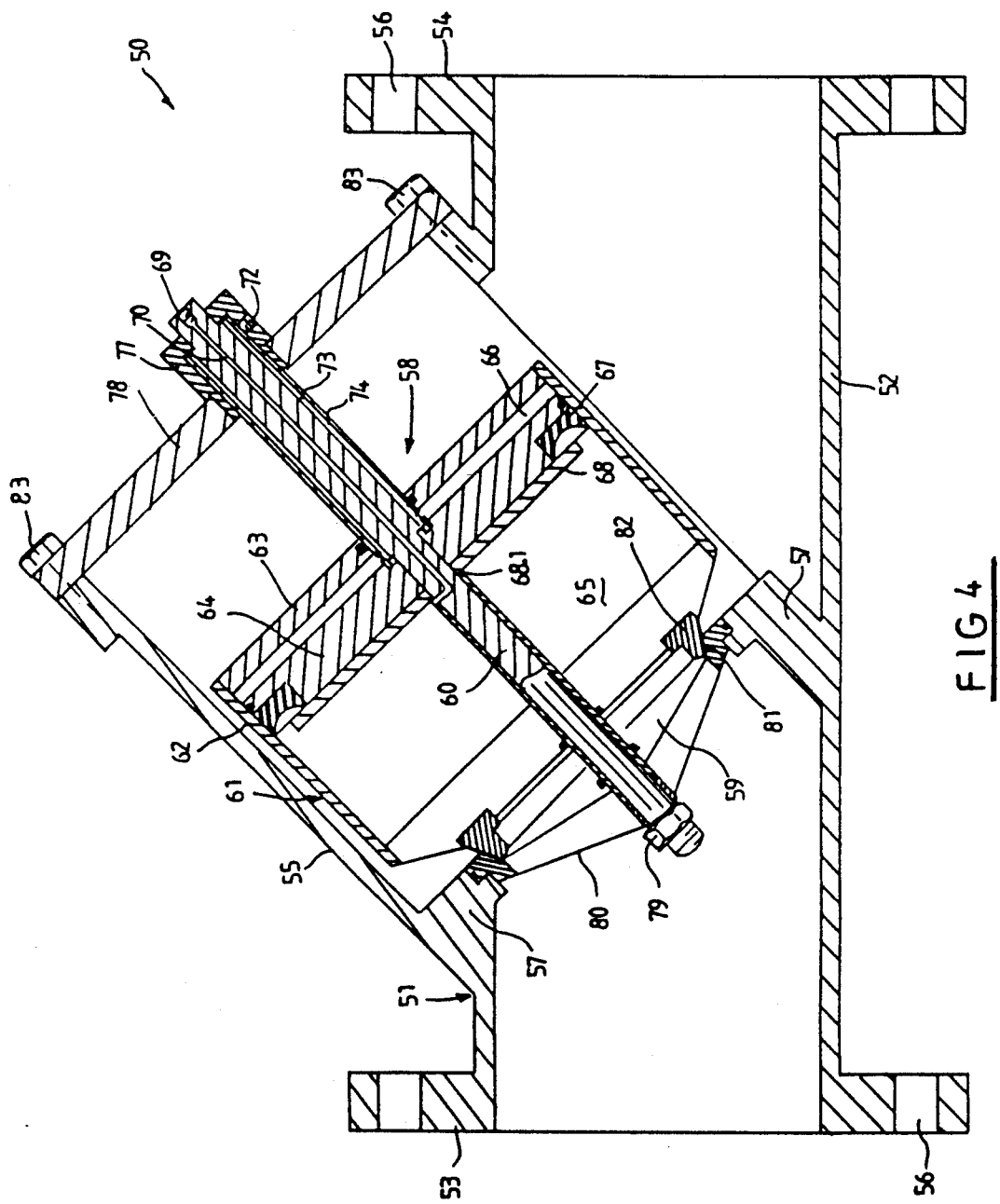
Figure 5:
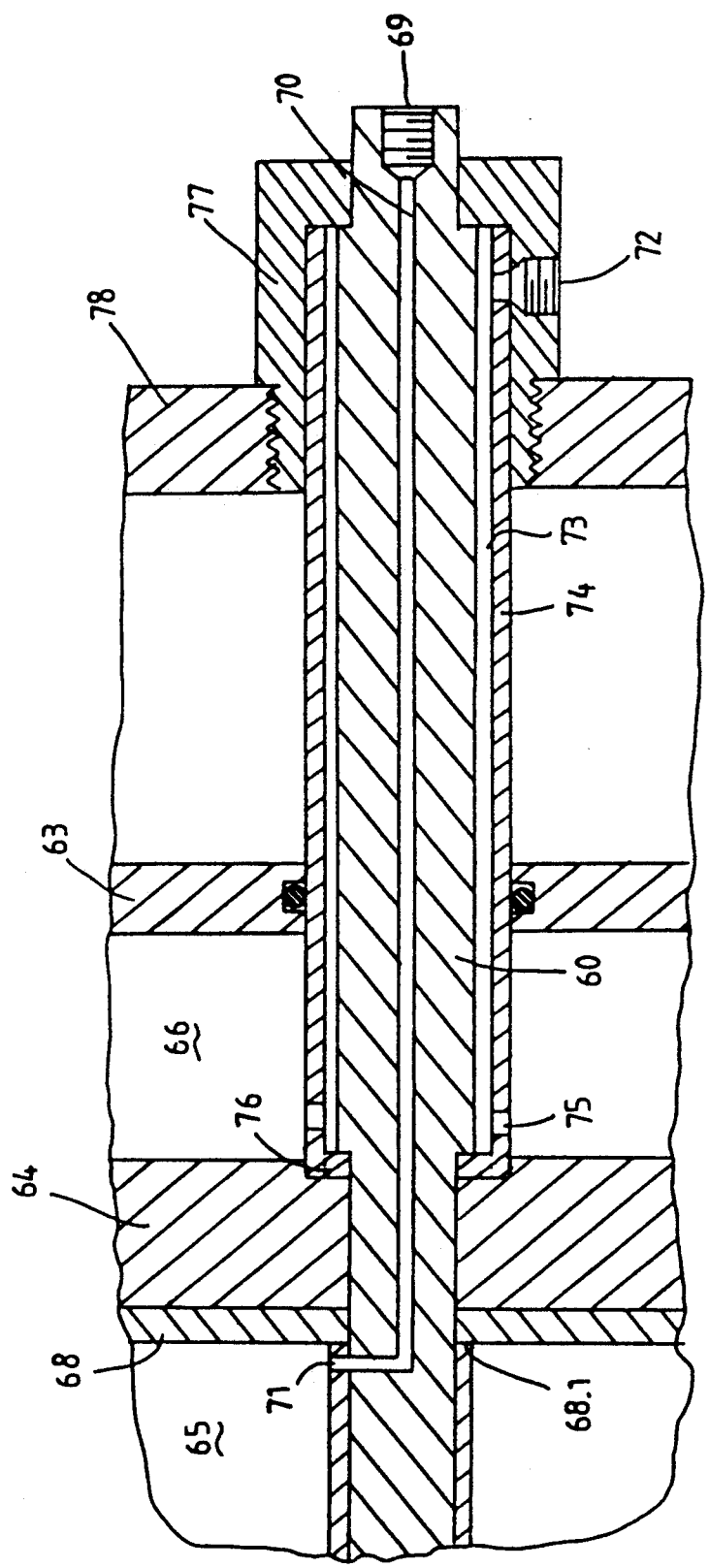
Figure 6:
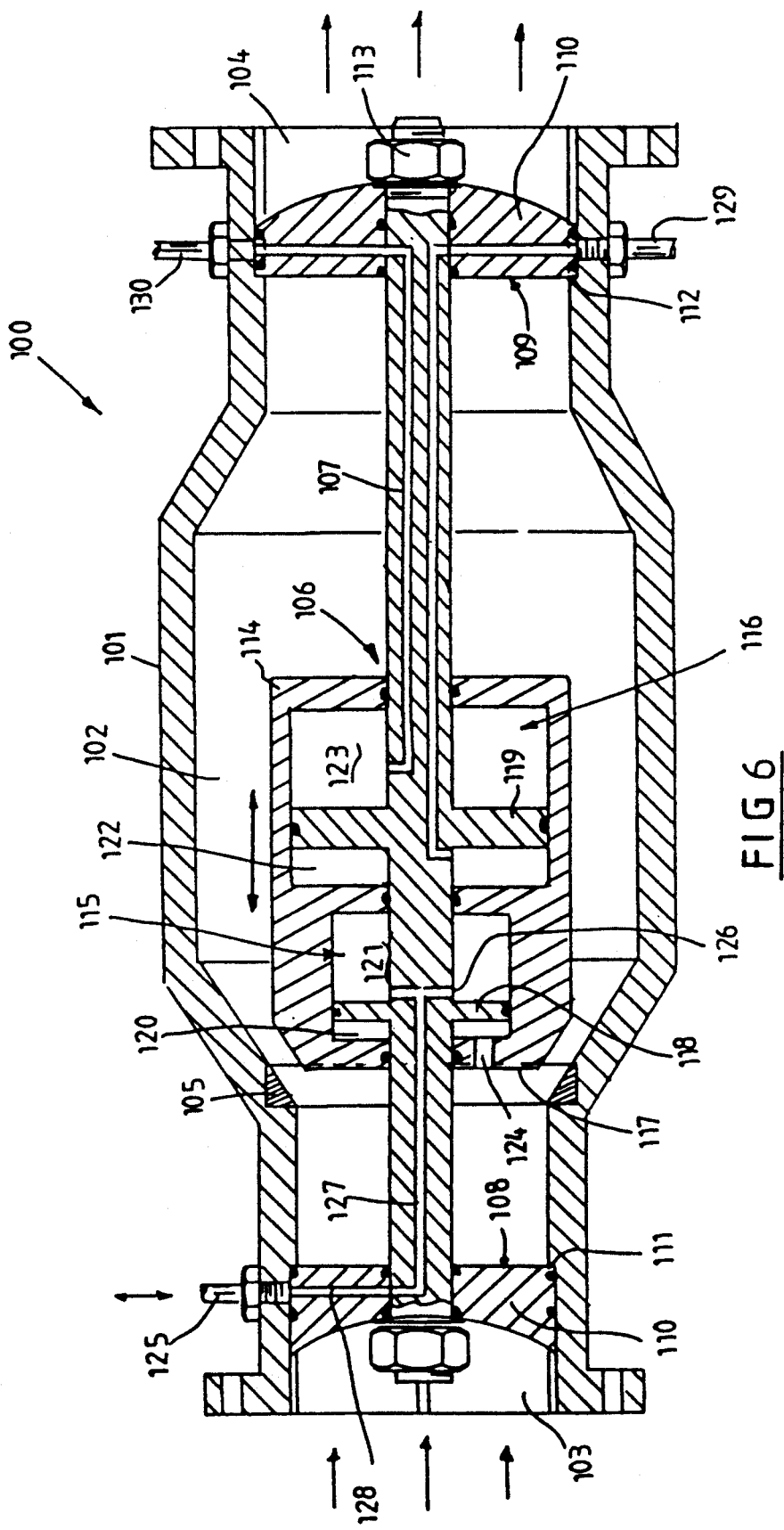

The invention will now further be described, by way of example only, with reference to the accompanying diagrams wherein:

FIG. 1: is a diagrammatic longitudinal section through a first embodiment of a fluid control valve according to the invention, illustrating a first embodiment of an actuator according to the invention for a closure member for the valve;

FIG. 2: is a diagrammatic end view of the valve in FIG. 1;

FIG. 3: is a diagrammatic longitudinal section through a second embodiment of the fluid control valve according to the invention, illustrating a second embodiment of the actuator according to the invention, the valve in this figure is in a partially open condition;

FIG. 4: is a view similar to that of FIG. 3 with the valve in its closed condition;

FIG. 5: is a diagrammatic enlarged view of a portion of the actuator of the valve in FIGS. 3 and 4; and FIG. 6: is a diagrammatic longitudinal section through a third embodiment of the fluid control valve according to the invention, illustrating a third embodiment of the actuator according to the invention.

A first embodiment of a fluid control valve according to the invention is generally designated by the reference numeral 10 in FIGS. 1 and 2. The valve comprises a valve body 11 defining a flow passage 12 extending between an inlet 13 to the valve and an outlet 14 from the valve. At inlet 13 and outlet 14 there are provided peripheral flanges 15 and 16, respectively, by means of which the valve may be connected into a pipe line (not shown).

The valve comprises an actuator 17 for a closure member of the valve. The closure member is constituted by a region 18 of a hollow member 19 mounted in the valve body to reciprocate on a shaft 20. The closure member 18 co-operates with a valve seat 21 provided in valve body 11.

The actuator 17 further comprises a circular, stationary partition 22 formed integrally with shaft 20. Shaft 20 is mounted to be stationary in body 11 and is supported by axially spaced spiders 23 and 24. Each spider comprises a plurality of radially outwardly extending spokes 25, better shown in FIG. 2. O-rings 26 provide fluid tight seals between shaft 20 and member 19.

The hollow member 19 comprises a tubular middle portion wherein partition 22 is located and two conical end portions. Partition 22 divides hollow member 19 into two annular fluid tight, variable volume chambers 26 and 27, one on either side of partition 22. On partition 22 there are provided peripheral U-seals 28.

Chamber 26 communicates with an external control port 29, via a bore 30 in spoke 25 of spider 23, a bore 31 defined in shaft 20 and openings 32 into chamber 26. Similarly chamber 27 communicates with an external control port 33 via a bore 34 defined in a spoke of spider 24, a bore 35 defined in shaft 20 and openings 36 into chamber 26.

In use, member 19 is moveable between a first position, shown in FIG. 1, wherein region 18 of member 19 is spaced from seat 21 so that the valve is open and a second position (not shown) wherein region 18 abuts against seat 21 so that the valve is closed.

Member 19 is moved towards its first position by causing the pressure of a fluid in chamber 26 to be lower than that of a fluid in chamber 27. Similarly the member 19 will move towards its second position when the pressure in chamber 27 is lower than that in chamber 26. The pressures in chambers 26 and 27 are controllable through ports 29 and 33, respectively.

It will be appreciated that as the contact regions between member 19 and shaft 20 may conveniently be made smaller than that between the moveable and stationary parts of most known actuator arrangements, the aforementioned problem of dirt in those regions may be reduced. Furthermore, pressure regulation fluids are filtered before introduction into chambers 26 and 27 thereby to reduce the possibility of debris and dirt damaging the sealing region between partition 22 and member 19 even further. In addition, inert UPVC, plastic or similar cylinder liners may be used to sleeve the inside walls of member 19.

The body 11 of the valve according to the invention may be fabricated from epoxy coated mild steel, or stainless steel, while the member 19 is preferably fabricated or cast in two non-corrodable parts to facilitate assembly of the actuator. It is envisaged that an actuator comprising spiders 23 and 24, shaft 20 and member 19 may be provided separately so that existing known valves may be modified to comprise the actuator of the present invention.

Furthermore, these separate parts will also facilitate replacement and reconditioning of already installed valves according to the invention.

In FIGS. 3 and 4 there is shown a fluid control valve 50 of the globe valve type. Body 51 of the valve comprises a first tubular portion 52 terminating in flanges 53 and 54 and a second tubular portion 55 provided at an angle relative to the first portion and communicating with the first portion at one end 55.1 thereof, as shown in FIG. 3.

In flanges 53 and 54 there are provided holes 56 disposed on a circle concentric with the central, longitudinal axis of the first portion 52. The valve may hence be mounted into a pipe line (not shown), in well known manner, by bolts (not shown) extending between and engaging flanges 53 and 54 and associated flanges (also not shown) in the pipe line, respectively.

At end 55.1 of tubular 55 member and in tubular member 52 there is provided a circular shoulder formation 57.

The valve comprises an actuator generally designated by the reference numeral 58 for causing a valve closure member 59 to move between an open position (shown in FIG. 3) and a closed position (shown in FIG. 4).

Actuator 58 comprises a shaft 60. A hollow member 61 is mounted on shaft 60 for movement between first and second axially spaced positions on the stem, shown in FIGS. 3 and 4, respectively. Hollow member 61 comprises cylindrical side walls 62, a conically shaped end wall facing shoulder 57 and constituting valve closure member 59 and a second end wall 63 opposite wall 59.

On shaft 60 and within hollow member 61 is provided a stationary, disc-like partition 64 dividing the hollow member into first and second annular fluid tight, variable volume chambers 65 and 66, respectively. Along the periphery of disc 64 there is provided a circular U-seal 67. U-seal 67 is held in position by disc 68 abutting against shoulder 68.1 on shaft 60. Chamber 65 communicates with a control port 69 via a bore 70 and an opening 71 into chamber 65, both defined in shaft 60. Chamber 66 communicates with a port 72 via annular passage 73 defined between shaft 60 and coaxial tube 74 and openings 75 into chamber 66, defined in tube 74. As better shown in FIG. 5, tube 74 is held in position with its one end received in circular groove 76 defined in partition 64 and its other end received in a bore of a member 77 threaded onto lid 78.

Towards the lower end of shaft 60 there is provided a nut 79 holding a circular spider 80 in position. On the periphery of spider 80 there is provided a stationary, circular valve seat with sealing face 81. When assembled, the seat seats on shoulder 57. A circular seal 82 is provided on wall 59 of hollow member 61. When the closure member is in its closed position (shown in FIG. 4) its seal 82 abuts against the aforementioned stationary sealing face 81.

The whole of the actuator and closure member assembly, which also includes the aforementioned seat, may be removed from the valve by loosening bolts 83 and removing lid 78. The assembly may hence conveniently be replaced by a new assembly, should the old one become unserviceable.

The valve 50 according to the invention is closed by causing the pressure of a fluid in chamber 65 to be higher than that of a fluid in chamber 66. This will cause closure member 59 carrying seal 82 to move into sealing engagement with face 81. Similarly, the valve is opened by causing the pressure in chamber 66 to be higher than that in chamber 65. The pressures in chambers 65 and 66 are controlled through ports 69 and 72, respectively. In some applications a spring (not shown) may be provided between end wall 63 and lid 78 to bias the closure member 59 towards its closed position.

A third embodiment of the valve according to the invention is shown in FIG. 6 and designated by the reference numeral 100. Valve 100 comprises a valve body 101 defining a flow passage 102 extending between an inlet 103 and an outlet 104. In the valve body 101 there is provided a valve seat 105.

Mounted in body 101 is an actuator 106 for a closure member for the valve which in use co-operates with seat 105 to open and close the valve.

The actuator comprises a shaft 107 supported in body 101 between two axially spaced spiders 108 and 109. The radially outward regions of spokes 110 of the spiders 108 and 109 abut against shoulder formations 111 and 112 in the valve body and bolts 113 serve to fasten the actuator in the body by urging the spiders towards one another and against the said shoulders.

On the shaft 107 there is provided a hollow member 114. Member 114 is moveable between a first position (shown in FIG. 6) wherein the valve is open and a second position wherein member 114 abuts against seat 105 to close the valve. The hollow member is circular in configuration and defines a first circular cavity 115 and a second circular cavity 116. The cross sectional area of cavity 115 is smaller than that of the region 117 of the outside wall of member 114 exposed to the inlet when the value is closed. The cross sectional area of cavity 116 approaches that of face 117.

On shaft 107 there are provided stationary partitions 118 and 119. Partition 118 divides cavity 115 into first and second annular, fluid tight, variable volume chambers 120 and 121, respectively, while partition 119 divides cavity 116 into first and second annular, fluid tight, variable volume chambers 122 and 123.

Chamber 120 communicates with the inlet of the valve via bore 124 defined in member 114. Chamber 121 communicates with control port 125 via openings 126 into chamber 121 and bore 127 both defined in shaft 107, and bore 128 defined in spoke 110 of spider 108. Similarly, chambers 122 and 123 communicate with control ports 129 and 130, respectively.

In use, ports 125 and 130 are connected to communicate with ambient or atmospheric pressure. The valve is opened by also connecting port 129 to atmospheric pressure. The hollow member is displaced towards its first position in that the force exerted on the region 117 of member 114 by the higher inlet pressure exceeds that exerted in the opposite direction by the pressure in chamber 120. To close the valve, port 129, which communicates with main control chamber 122 is connected to the inlet of the valve. The force in the said opposite direction excerted on the member 114 by the pressures in chambers 120 and 122 now exceeds that exerted on region 117, so that the member 114 is caused to move towards its second position, to close the valve. To open the valve, chamber 122 is vented to atmosphere.

It will be appreciated that there are many variations in detail possible on the fluid control valve and the actuator therefore according to the invention without departing from the scope and spirit of the appended claims.

What is claimed:

1. An actuator for a closure member for a fluid control valve, which valve comprises a valve body defining an inlet to the valve and an outlet from the valve, the actuator comprising:
   a shaft mountable in the valve body;
   a hollow member mounted on the shaft to reciprocate relative to the longitudinal axis of the shaft;
   a region of an outside wall of the hollow member constituting a valve closure member;
   the hollow member defining first and second spaced, fluid tight cavities;
   a stationary partition for each of the cavities mounted on the shaft and dividing the cavities into first and second fluid tight variable volume chambers, one on either side of the partition;
   an internal wall of the hollow member bordering a chamber in the first cavity and which wall faces the region of the hollow member constituting the closure member, said internal wall being smaller in surface area than the said region, and the combined area of the said internal wall and an internal wall of the hollow member bordering a chamber in the second cavity also facing the said region being at least equal to the area of the region; and
   the chambers communicating with control ports so that the pressure of a fluid in the chambers may be varied so that differences in pressure and surface area may be used to cause the hollow member to move between first and second positions on the shaft thereby, in use, to move the valve closure member between open and closed positions.

2. An actuator as claimed in claim 1 wherein the first and second cavities are spaced longitudinally along the shaft.

3. An actuator as claimed in claim 2 wherein the first cavity, in use, faces the valve inlet, wherein the chamber in the first cavity facing the closure member region, in use, also faces the inlet and communicates with the valve inlet; wherein an outlet chamber in the first cavity communicates with a pressure lower than that at the valve inlet; wherein an outlet facing chamber in the second cavity also communicates with the lower pressure; and wherein the chamber in the second cavity facing the closure member region is a main control chamber which is connectable to communicate with the lower pressure to open the valve and with the pressure at the inlet to close the valve by causing the member to move towards a seat located in the valve between the inlet and the member.

4. An actuator as claimed in claim 1 wherein the partitions are circular and mounted concentrically on the shaft; wherein the cavities are circular in transverse cross section and wherein a seal is provided between each partition and the hollow member.

5. An actuator as claimed in claim 1 wherein the shaft is mounted on two axially spaced spiders which are mountable in the valve body.

6. An actuator as claimed in claim 5 wherein at least one of the chambers communicates with its associated control port via a bore defined in the shaft and extending between, at one end, an opening defined in the shaft into the chamber and at another end, the port.

7. An actuator as claimed in claim 6 wherein the bore in the shaft at its other end communicates with a bore defined in a radially outwardly extending spoke of the spider and wherein the bore in the spoke communicates with the control port.

8. A fluid control valve comprising:
   a valve body defining a flow passage extending between an inlet to the body and an outlet therefrom;
   a seat and an actuator for a valve closure member located in the valve body;
   the actuator comprising a stationary shaft and a hollow member mounted on the shaft to reciprocate relative to the longitudinal axis of the shaft;
   a region of an outside wall of the hollow member constituting the valve closure member;
   a stationary partition for each of the cavities mounted on the shaft and dividing the cavities into first and second fluid tight, variable volume chambers, one on either side of the partition;
   an internal wall of the hollow member bordering a chamber in the first cavity and which wall faces the region of the hollow member constituting the closure member, being smaller in surface area than the said region, and the combined surface area of the said internal wall and an internal wall of the hollow member bordering a chamber in the second cavity also facing the said region being at least equal to the surface area of the region; and
   the chambers communicating with control ports so that the pressure of a fluid in the chambers may be varied so that differences in pressure and surface area may be utilized to cause the hollow member to move between first and second positions on the shaft, thereby, in use, to move the region of the hollow member between an open position wherein it is spaced from the seat and a closed position wherein it is in sealing engagement with the seat.

9. A valve as claimed in claim 8 wherein the seat is located between the inlet and the hollow member and wherein the first and second cavities are spaced longitudinally along the shaft, with the first cavity facing the valve inlet; wherein the chamber in the first cavity facing the closure member region also faces the inlet and communicates with the valve inlet; wherein an outlet facing chamber in the first cavity communicates with relatively lower pressure; wherein an outlet facing chamber in the second cavity also communicates with the relatively lower pressure and wherein the chamber in the second cavity facing the closure member region is a main control chamber which is connectable to communicate with one of the relatively lower pressure, thereby to cause the hollow member to move towards its first position, and with the pressure at the inlet, thereby to cause the hollow member to move towards its second position.

* * * * *